3,427,719
DENTAL UNIT
Fred G. Gordon, Berkeley, and Norman H. Hermstad, Novato, Calif., assignors to Time & Motion Dentistry Corporation of America, a corporation of California
Filed Jan. 4, 1967, Ser. No. 607,286
U.S. Cl. 32—22                                      4 Claims
Int. Cl. A61c *19/02;* F16j *1/10*

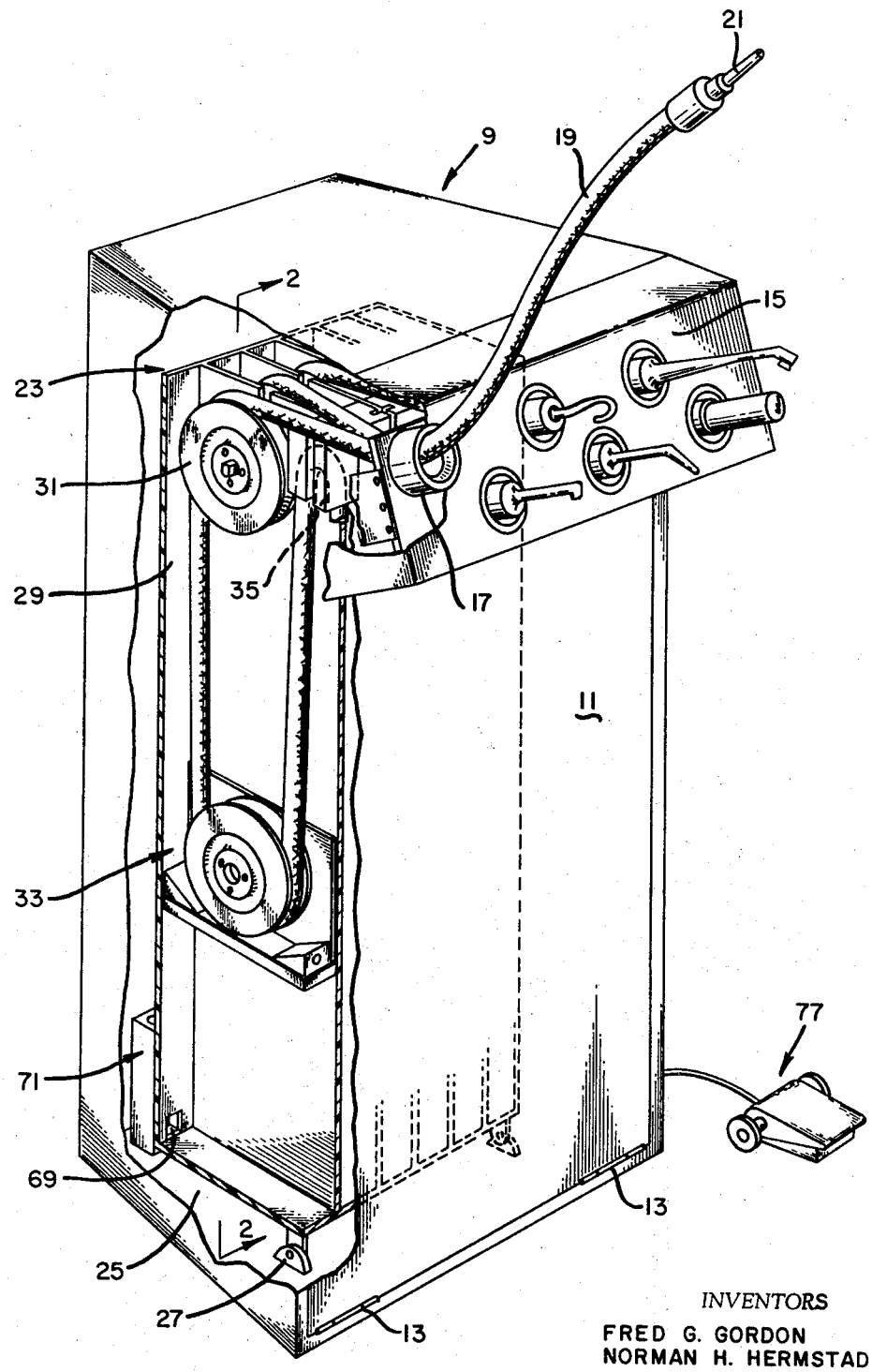
FIG._1_
INVENTORS
FRED G. GORDON
NORMAN H. HERMSTAD
BY
ATTORNEYS

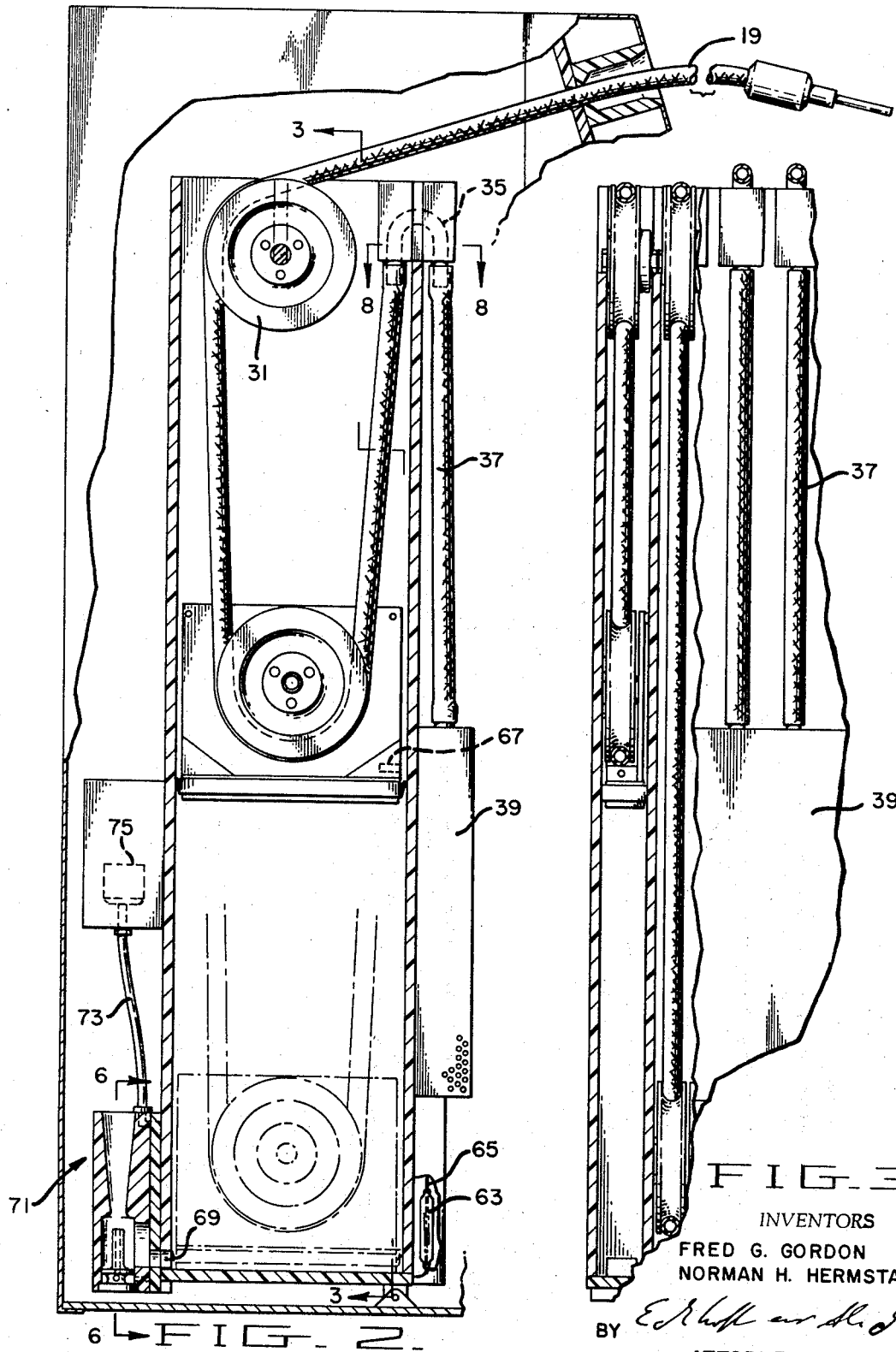

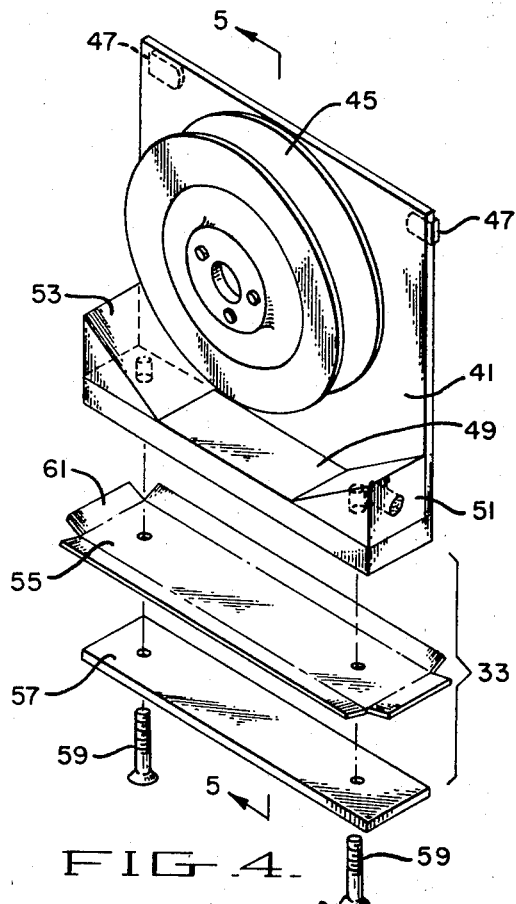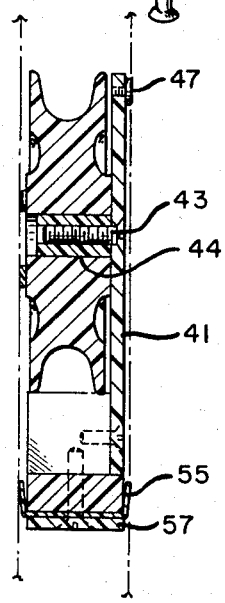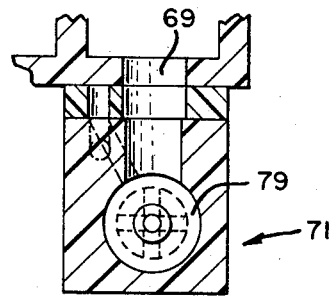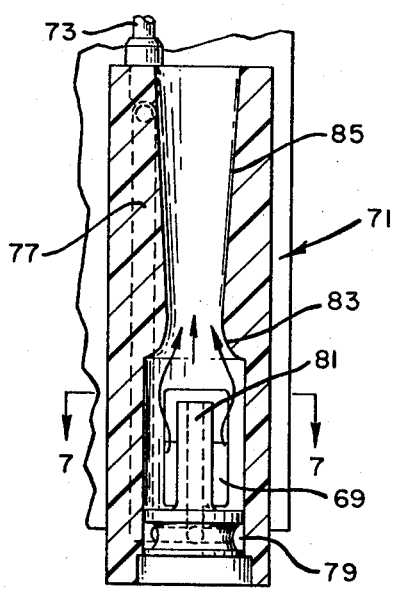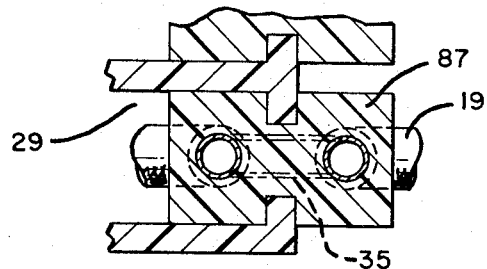

ABSTRACT OF THE DISCLOSURE

A vacuum actuated retractable dental unit having utility lines wherein an automatic switch turns the utility lines on when extended. The utility lines supplying electricity, vacuum, pressure and the like. Upon retraction of the utility lines there is a system employed having a permanent magnet therein which serves to actuate a magnetic switch for turning the utility lines off and on again when the utility lines are extended.

BACKGROUND OF THE INVENTION

Field of the invention

The invention relates to a power unit for dental offices.

Description of prior art

It is believed prior units depended on energy stored during extension for the retraction of a unit. The present invention provides power means for retraction.

SUMMARY OF THE INVENTION

Retractable dental units have been long known but these have required a considerable amount of effort to use. Ordinarily such units are constructed on a principle whereby one stores energy, e.g. by gravity, as one pulls the unit out and this stored energy serves to retract the unit. Thus a considerable amount of effort is needed to extend the unit and, unless some complicated holding means is used, pressure must continuously be exerted on the unit to hold it in the extended position.

It is an object of the present invention to provide a retractable dental unit which requires little effort on the part of the user to extend the unit.

Another object of the present invention is to provide an extendable dental unit which will stay extended without the continuous expenditure of energy.

Still another object of this invention is to provide an extendable dental unit having a simple, air actuated power retraction means.

A further object of the invention is to provide a simple switching arrangement whereby the unit will be automatically turned on as it is extended.

Another object of the invention is to provide a dental unit wherein the hose or tubing is stored in a relaxed state rather than under tension.

Still another object of the present invention is to provide a retractable dental unit having a novel rectangular piston structure whereby a large number of different instrument units can be combined in a relatively small cabinet.

BRIEF DESCRIPTION OF THE DRAWINGS

FIGURE 1 is a perspective view of a device embodying the present invention with part of the structure cut away.
FIGURE 2 is a section on the line 2—2 of FIGURE 1.
FIGURE 3 is a section on the line 3—3 of FIGURE 2.
FIGURE 4 is an exploded, enlarged view of the novel piston structure employed in the present invention.
FIGURE 5 is a section on the line 5—5 of FIGURE 4.
FIGURE 6 is an enlarged section on the line 6—6 of FIGURE 2.
FIGURE 7 is a section on the line 7—7 of FIGURE 6.
FIGURE 8 is an enlarged section on the line 8—8 of FIGURE 2.

DESCRIPTION OF THE PREFERRED EMBODIMENTS

Turning now to a description of the drawings by reference characters, there is shown a multiple dental unit having a cabinet generally designated 9, including a front panel 11 mounted by means of hinges 13 that can be readily tilted forward for servicing the unit. Mounted at the top of the front panel 11 and extending thereover is a tilted panel 15 having a plurality of bezels as at 17. Tubes as at 19 having any of the usual dental instruments 21 thereon pass through the bezels.

The retraction unit within cabinet 9 has been generally designated 23 and is mounted on floor 25 of the cabinet by means of a hinge 27 which allows the retraction unit to be tilted forward out of the cabinet for easy servicing.

The retraction unit includes a number of rectangular compartments as at 29 which are open at the top and generally airtight at the bottom except for the opening hereinafter mentioned. Mounted at the top of compartment 29 is a pulley 31 and floating within the compartment is a rectangular piston structure generally designated 33. As can be seen from the drawings, the hose 19 passes over the pulley 31, over the piston structure 33 and terminates in a gooseneck fitting 35. From a fitting 35 another hose 37 leads to some dental unit, such as a vacuum unit 39.

Piston structure 33 will now be described in detail. This unit comprises a flat plate 41 having a threaded shaft 43 attached thereto and having a bushing 44 on which pulley 45 rotates. Bushing 44 is preferably made of a plastic such as nylon which is selected because of its low friction and long wearing properties. Plastic pads 47 are preferably provided on plate 41 for long wear. Pads 47 can be made of a suitable plastic such as Teflon. Attached to plate 41 is a bottom member 49 having attachment blocks 51 and 53 thereon. Mounted on the bottom plate 49 is a plastic gasket 55 which is held on by means of a plate 57 and suitable screws 59. The gasket 55 has upturned edges as at 61 so that it provides a substantially vacuum tight joint within the chamber. Further, because of the bent-over edges 61, a small amount of friction is provided so that as the unit is pulled out, it will stay in any given position until vacuum is applied. Obviously the degree of friction provided need only be very slight, i.e. merely sufficient to overcome the gravity of the assembly 33.

Mounted adjacent each chamber is a magnetically polarized reed switch 63 connected by suitable wiring 65 to unit 39 for actuating the particular unit 39 which is mounted in this compartment. Mounted within the piston structure 33 is a small permanent magnet 67. Switch 63 is of the normally closed type and opens when magnet 67 is placed adjacent to it. Thus when the dental unit is retracted, i.e. as is shown in dot-dash lines in FIGURE 2, magnet 67 causes switch 63 to open shutting off unit 39. However, as soon as piston assembly 33 is raised slightly, by extending hose 19, switch 63 closes turning on the unit 39.

In order to provide a power retraction means, an opening 69 is provided in chamber 29 which leads to an air aspirator 71. Aspirator 71 is connected by means of tube 73 to a solenoid valve 75 which is in turn controlled by a foot switch 77. Foot switch 77 is preferably of the four-way type so that one foot switch will serve to control four different instruments. Further, the foot control has one retraction actuating switch. Said switch is connected to the proper retraction unit by a relay (not illustrated) operated by the reed switch of the given retraction cylinder. The air aspirator 71 includes an air inlet 77 leading to the annular space 79 having a discharge port 81. Passage 69 extends from one side as is shown. The aspirator includes a convergent section 83 and a divergent section 85 which greatly increases the efficiency of the unit. Thus as the solenoid valve 75 is opened, and air is introduced through line 73, a vacuum is produced by the aspirator, pulling air through passage 69 and causing retraction of the piston 33. As the piston assembly 33 reaches its bottom position, reed switch 63 is opened by magnet 67, shutting off unit 39.

In FIGURE 8, a simple structure is shown for connecting the tubing 37 to the flexible hose 39. This comprises a plastic member 87, which is suitably notched as shown, to fit between the walls of one of the compartments, as at 29 and which has a gooseneck structure 35 embedded therein. The member 87 also serves as a stop to prevent the piston structure 33 from coming out of the compartment.

It is believed apparent from the foregoing that we have provided a simple yet effective structure for housing a plurality of dental units wherein power means is used to retract the units, wherein the units automatically turn on upon being extended and wherein due to the unique rectangular piston shape, a large number of units can be contained within a relatively small cabinet.

We claim:
1. A dental instrument unit comprising in combination a extendable utility line having a dental instrument thereon, said flexible member being anchored within a cabinet and being trained over a pulley on a movable piston within said cabinet and then trained over a fixed pulley to extend outside of the cabinet and means whereby vacuum can be applied to said piston to retract said extendable utility line.

2. The structure of claim 1 wherein the piston has a rectangular configuration.

3. The structure of claim 1 wherein said piston contains a permanent magnet and wherein a magnetically actuated switch is provided in the vicinity of said chamber whereby said switch will be open when the piston is in one position and closed when the piston is in another position.

4. The structure of claim 1 wherein an air aspirator is employed to provide vacuum for piston retraction.

References Cited

UNITED STATES PATENTS

| | | | |
|---|---|---|---|
| 2,328,924 | 9/1943 | Ruf | 32—22 |
| 2,786,361 | 3/1957 | Russell. | |
| 2,980,355 | 4/1961 | Cannings. | |
| 3,197,868 | 8/1965 | Guichet | 32—22 |
| 3,217,412 | 11/1965 | Pascente | 32—22 |

ROBERT PESHOCK, *Primary Examiner.*

U.S. Cl. X.R.

226—113, 118